United States Patent [19]

Cochard et al.

[11] Patent Number: 5,385,047
[45] Date of Patent: Jan. 31, 1995

[54] ANGULAR SPEED MEASURING DEVICE

[75] Inventors: Roland Cochard; Pierre Jeannin, both of Morges, Switzerland

[73] Assignee: Robert Bosch GmbH, Stuttgart, Germany

[21] Appl. No.: 75,768

[22] Filed: Jun. 11, 1993

[30] Foreign Application Priority Data

Jul. 16, 1992 [DE] Germany ............................. 4223349

[51] Int. Cl.⁶ .......................... G01P 15/08; G01P 9/04
[52] U.S. Cl. ............................... 73/517 A; 73/517 R; 73/505
[58] Field of Search ......... 73/517 A, 517 R, 517 AV, 73/505, 510, 511

[56] References Cited

U.S. PATENT DOCUMENTS

| | | | |
|---|---|---|---|
| 4,510,802 | 4/1985 | Peters | 73/517 AV |
| 4,590,801 | 5/1986 | Merhav | 73/505 |
| 4,744,248 | 5/1988 | Stewart | 73/510 |
| 4,814,680 | 3/1989 | Hulsing | 73/517 AV |
| 5,198,663 | 3/1993 | Ichikawa et al. | 73/517 AV |

FOREIGN PATENT DOCUMENTS

| | | |
|---|---|---|
| 0369352 | 5/1990 | European Pat. Off. |
| 0405152 | 1/1991 | European Pat. Off. |
| 3830384 | 1/1992 | Germany |
| 4032559 | 4/1992 | Germany |

Primary Examiner—Hezron E. Williams
Assistant Examiner—Helen C. Kwok
Attorney, Agent, or Firm—Michael J. Striker

[57] ABSTRACT

The angular speed measuring device has two acceleration sensors mounted on a circular plate rotating about a first rotation axis and each sensor generates a signal depending on a Coriolis force produced when it rotates about two additional rotation axes. The rotation axes are orthogonal and the acceleration sensors are at least partially made of silicon and displaced by 180° on the planar plate. An initial signal processing device is mounted directly on a circular planar plate on which the acceleration sensors are mounted. A light emitting diode is used to transmit the signals from the initial signal processing circuit to a signal processing circuit off the planar plate via a photodiode receiving device.

13 Claims, 4 Drawing Sheets

ANGULAR SPEED MEASURING DEVICE

BACKGROUND OF THE INVENTION

The present invention relates to devices for measuring an angular speed.

An angular speed measuring device is known having at least one acceleration sensor moving on a circular path about a first rotation axis. The acceleration sensor is structured to measure a Coriolis force, which results when the angular speed measuring device rotates about two additional rotation axes, the three rotation axes mentioned above being mutually orthogonal.

Published European Patent Application A2 405 152 describes an angular speed sensor, in which two acceleration sensors move on a circular path around a first rotation axis. By rotation about an additional axis, which is perpendicular to the first rotation axis, Coriolis forces are produced, which act on the acceleration sensors. The accelerations sensors are bendable piezoelectric beams, which are attached with one end to a rotatable axle. A mounting and alignment method described in this reference allows a particularly accurate attachment and alignment of the piezoelectric elements to the rotatable axle.

Published European Patent Application A1 369 352 describes a different type of acceleration sensor, which is constructed in part from silicon wafers.

SUMMARY OF THE INVENTION

It is an object of the present invention to provide an improved angular speed sensor based on an acceleration sensor having at least one bendable piezoelectric beam of the above described type.

According to the invention, the angular speed measuring device comprises a rigid planar plate rotatable about a first rotation axis; at least one acceleration sensor at least partially made of silicon, advantageously two acceleration sensors displaced 180° from eachother, fixed on the rotatable planar plate so as to be rotatable on a circular path about the first rotation axis by rotation of the planar plate, the at least one acceleration sensor including means for generating a signal depending on a Coriolis force experienced by the at least one acceleration sensor when the at least one acceleration sensor is rotated about two other rotation axes, the two other rotation axes and the first rotation axis being in an orthogonal relationship to each other; transmitting means for transmitting the signal off the planar plate, mounted on the planar plate and connected to the at least one acceleration sensor for contactless transmission of the signal generated in the at least one acceleration sensor from the planar plate; receiver means for receiving the signal transmitted from the transmitting means located off the planar plate; and means for processing the signal received by the receiver means to obtain components of the angular speed located off the planar plate.

The angular speed sensor according to the invention has the advantage that acceleration sensors made partially of silicon have an improved measurement accuracy for angular speed. The angular speed sensor has a minimal sensitivity to transverse acceleration. Micromechanical acceleration sensors made from silicon can be aligned exactly to the rotation axis and under each other with comparatively simple means. The manufacturing costs for angular speed sensors are reduced by the comparatively simple assembly procedure resulting from the structure according to the invention.

The acceleration sensor according to the invention is mounted on a planar plate. Because of this arrangement a particularly accurate alignment and adjustment of the acceleration sensor relative to the rotation axis can be obtained. Glass, silicon or ceramic materials are particularly suitable materials for the planar plate. Means for an initial processing of the signals produced by the acceleration sensor is provided directly adjacent to the acceleration sensor on the plate in a preferred embodiment. The entire angular speed sensor has a particularly compact structure and a structure which reduces interference with the signal from the acceleration sensor. Means for signal analysis to determine components of the angular speed, especially expensive arrangements, which take up considerable space, can be provided off the planar plate on which sensor is mounted. An especially interference free transmission of the signal to the exterior analyzing devices is provided by transmitting means, which advantageously is constructed as a light emitting diode. The feed of electrical power to the rotating plate can occur by rotating transformer because this type of power transmission is particularly reliable and free of interference and scarcely any wear results. In a particularly preferred embodiment a portion of the rotating transformer can be formed as a thick or thin film coil on the underside of the plate. Because of this feature it is possible to make the rotating plate assembly by an especially desirable mass production method. Because of the use of acceleration sensors displaced about 180° relative to each other different interference effects can be suppressed in the measurement of the angular speed. Thus it is particularly advantageous when both micromechanical acceleration sensors have nearly exactly the same properties in regard to damping and temperature drift. Particularly the effect of acceleration parallel to the rotation axis is strongly reduced due to the formation of a difference between both signals. Furthermore the two different rotation axes can be distinguished by phase-dependent filtering means.

BRIEF DESCRIPTION OF THE DRAWING

The objects, features and advantages of the present invention will now be illustrated in more detail, by the following detailed description, reference being made to the accompanying drawing in which.

DESCRIPTION OF THE PREFERRED EMBODIMENT

Figure 1:
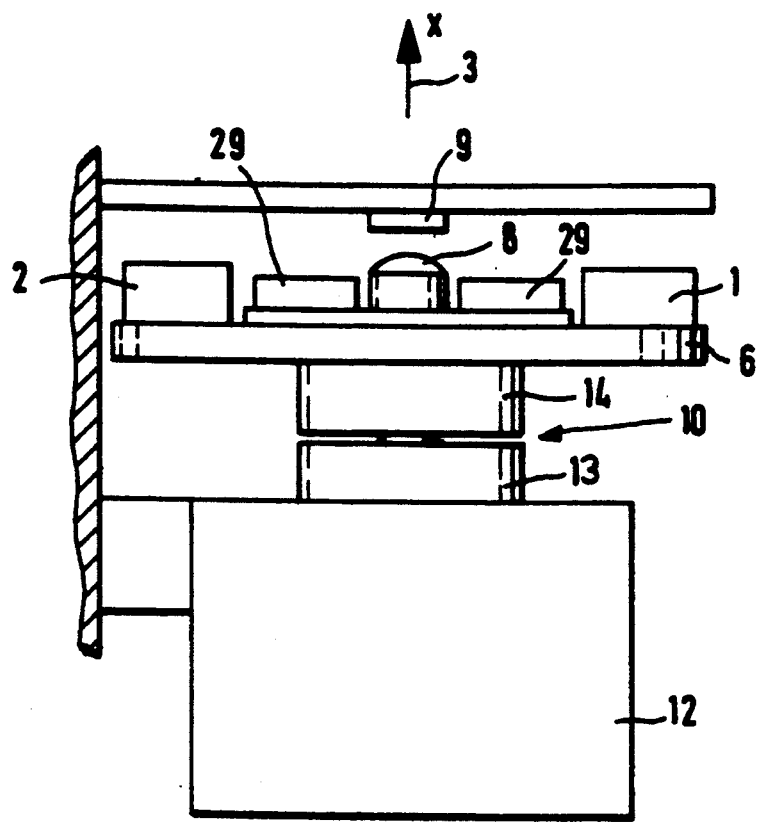
FIG. 1 is a side view of an angular speed sensor mounted on a planar plate according to the invention.
Figure 2:
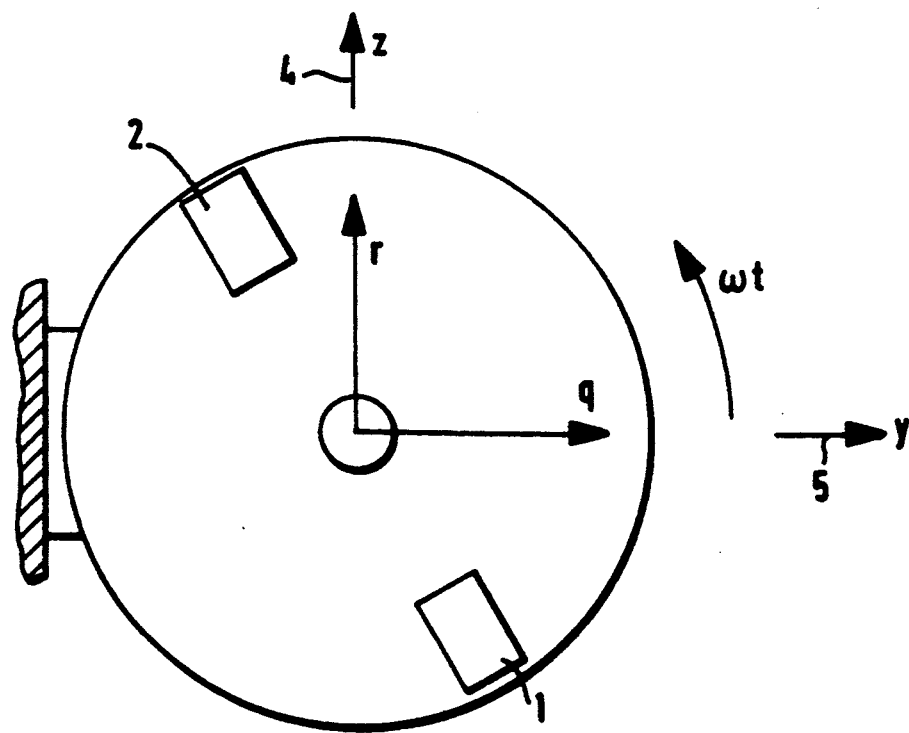
FIG. 2 is a plan view of the planar plate of FIG. 1.

A first embodiment of an angular speed sensor is shown in FIGS. 1 and 2. A planar plate 6 is rotatably mounted so that it can be put into rotation by a motor 12 about a first rotation axis x. This rotation occurs with an angular speed $\omega$ and is indicated with a curved arrow in FIG. 2. Two acceleration sensors 1,2 are mounted on the planar plate 6. The acceleration sensors 1,2 are rotated about the first rotation axis 3 when the planar plate 6 is driven rotatably by the motor 12. A initial first signal processing circuit 29 and a transmitting means 8 are also mounted on the planar plate 6. A first processing of the signals from the acceleration sensors 1,2 occurs in the first signal processing circuit 29. The signals from the initial signal processing circuit 29 are transmitted to a receiving means 9 by the transmitting means 8. The transmitting means 8 can be a light emitting diode and the receiving means 9 can be a photodiode. The initial signal processing circuit 29 and additional exterior signal processing circuits are discussed in more detail in regard to FIG. 5. Power for the first signal processing circuit 29 and the light emitting diode 8 is supplied by a rotating transformer 10. The rotating transformer 10 has at least one locally fixed coil 13 and at least one rotating coil 14. By supplying an alternating current to the locally fixed coil 13 a suitable current is induced in the rotating coil 14. Current for the first signal processing circuit 29 and the light emitting diode 8 is reliably supplied by the rotating transformer 10. It is particularly advantageous when the rotating transformer 10 is interference-free and wear-free. The angular speed sensor described here can be used in applications where a long life is necessary, especially in motor vehicle applications.

An xyz coordinate system is shown in FIGS. 1 and 2. Two vectors r and q are also shown in FIG. 2, which are respectively the projections of the rotation speed on the z and y axes. These vectors r and q are defined as follows:

$$r = \dot{\gamma} \cos \alpha \cos \beta - \dot{\beta} \sin \alpha \tag{1}$$

$$q = \dot{\beta} \cos \alpha + \dot{\gamma} \sin \alpha \cos \beta \tag{2}$$

The angles of rotation $\alpha$, $\beta$, $\gamma$ are defined in relation to a nonrectangular coordinate system, in which $\alpha$ is the angle of rotation about the x-axis shown in FIG. 1, $\beta$ the angle of rotation from the y-axis displaced by the angle $\alpha$ during rotation about the x-axis, and $\gamma$ is the angle of rotation from the z-axis rotating with the angles $\alpha$ and $\beta$. With the angular speed sensors, which measure the Coriolis a force and operate here in a rotating coordinate system, the rotation angles $\alpha$, $\beta$, $\gamma$ and the angular rotation speeds are not directly measurable, but only the projections on the rectangular coordinate system xyz, i.e. the speed vectors r and q. The significance of the vectors r and q is particularly clear, when one sets all angles $\alpha$, $\beta$, $\gamma$ equal to 0 or takes a very small value for these angles. In that case:

$$r = \dot{\gamma}; \quad q = \dot{\beta} \tag{3}$$

Thus an angular speed alone is determined by measurement of q and r.

The acceleration measured at the acceleration sensors 1,2 thus amounts to:

$$\ddot{X}_1 = \ddot{X}_o + RA(t) \sin(\omega t) + RB(t) \cos(\omega t) \tag{4}$$

$$\ddot{X}_2 = \ddot{X}_o - RA(t) \sin(\omega t) - RB(t) \cos(\omega t) \tag{5}$$

wherein $$A(t) = \dot{r} - 2q\omega \tag{6}$$

$$B(t) = \dot{q} + 2r\omega \tag{7}$$

wherein R is the mounting radius of the acceleration sensors 1,2 relative to the rotating axle 3. The variable $x_o$ is the acceleration of the entire sensor system in the x-direction, which however is an interfering variable. The measured signals $V_1$ and $V_2$ of the acceleration sensors 1,2 are proportional to this acceleration with a factor S in their bandwidth. By forming the difference of both signals $V_2$ and $V_1$ the interfering portion of the acceleration in the x-direction can be suppressed:

$$V_2 - V_1 = -2RS\{A(t) \sin(\omega t) + B(t) \cos(\omega t)\} \tag{8}$$

The processing of these signals is described in connection with FIG. 5.

Figure 3:
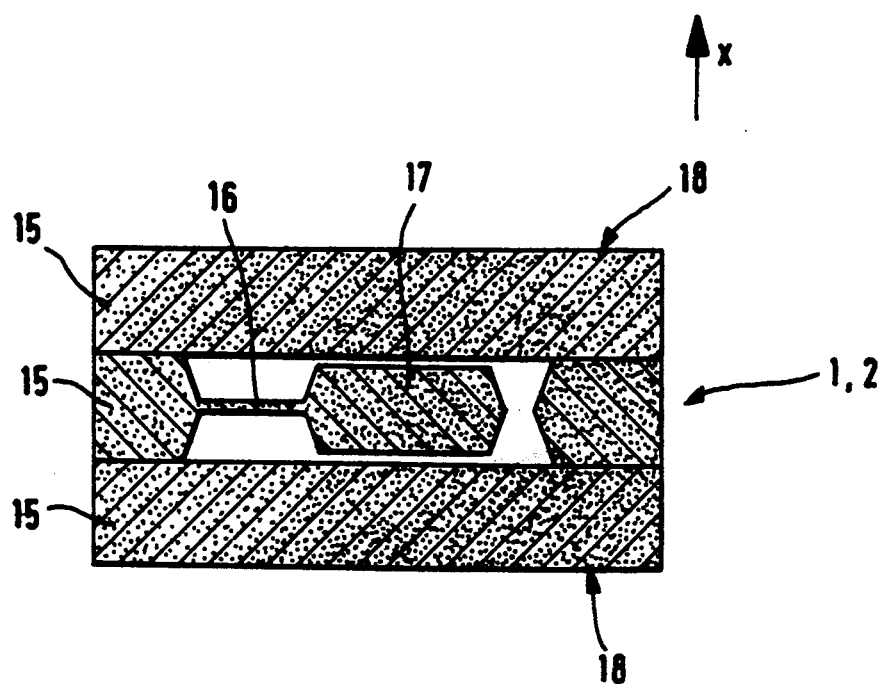
FIG. 3 is a cross-sectional view through an acceleration sensor.

In FIG. 3 an acceleration sensor 1,2 is shown which is arranged on the planar plate 6. These acceleration sensors are generally known and described in European Patent Applications EP A1 369 352. The acceleration sensors 1,2 comprise three platelet-like silicon members 15, which are stacked together in layers. A seismic body 17 is connected to a central silicon member 15 via a resilient tongue element 16. The seismic body 17 and the tongue element 16 together comprise a movable sensor portion. The position of the seismic body 17 relative to the upper and lower platelet-like silicon members 15 depends on the acceleration in the x-direction. Since the three platelet-like silicon planar members are electrically insulated from each other, the electrical capacitance changes between the silicon members changes because of the motion of the seismic body 17.

Other embodiments of the acceleration sensors 1, 2 are conceivable. For example a silicon planar element between two glass plates with electrodes formed by vapor deposition is described in Published European Patent Application A1 369 353.

The acceleration sensors 1,2 used herein are particularly suitable in a special way for use in angular speed measuring devices, which operate on the Coriolis acceleration principle. Greater measuring sensitivity with reduced transverse sensitivity can be obtained with the acceleration sensors 1,2 used here than with piezoresistive beam transducers. Even more importantly the acceleration sensors 1,2 described here can be mounted with greater precision with simple means. The assembly and mounting of the piezoelectric beam element as is described in EP A2 405 152 is greatly simplified, if the acceleration sensors described here are used. The planar plate 6, which is used in the angular speed sensor, may be manufactured economically with comparatively reduced expense and in large numbers. Clearly defined measurement axes of the acceleration sensors 1,2 and perpendicular mounting surfaces 18 on the upper and lower sides of the acceleration sensors 1,2 can be made because of the high accuracy of the micromechanical structuring of the acceleration sensors 1,2.

Figure 4:
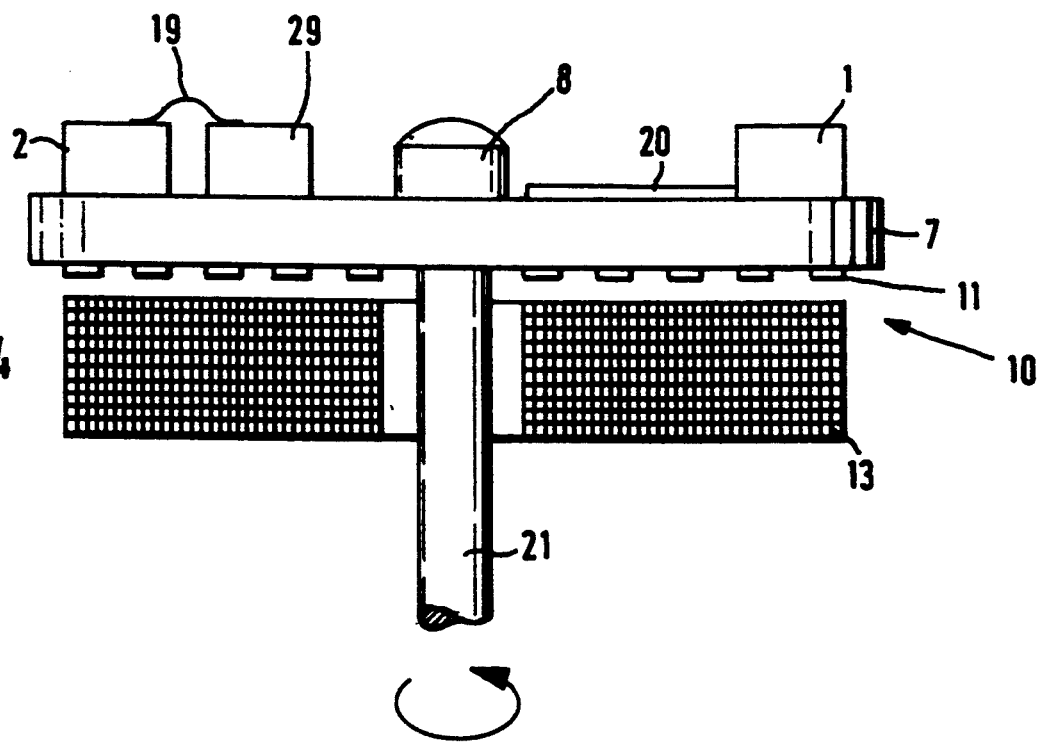
FIG. 4 is a side view of another embodiment of an angular speed sensor according to the invention mounted on another planar plate.

Another embodiment for the angular speed sensor according to the invention is shown in FIG. 4. Because of the high precision with which the acceleration sensors 1,2 can be mounted on a planar plate 7, it is possible to perform accurate analysis to obtain the rotation speed. Two acceleration sensors 1,2, first signal processing circuit 29 and a light emitting diode 8 are arranged on the upper surface of the planar plate 7. Bonding wires 19 or conductor strips 20 make the electrical connection between the acceleration sensors, the initial signal processing circuit 29 and the light emitting diode 8. The planar plate 7 is rotated about the x-axis by a rotating axle 21. The voltage supply for the initial signal processing circuit 29 and the light emitting diode 8 is provided either by a rotating transformer 10, which has at least one locally fixed coil 13 and at least one rotating coil 11.

The planar plate 7 can be a silicon wafer, a glass disk or a ceramic substrate. This substrate can easily be provided with a particularly reduced surface roughness. It is possible to apply a rotating coil 11 of the rotating transformer 10 by suitable thickfilm- or thinfilm methods on any of these substrates. The manufacture of the rotating coil 11 can thus occur economically directly on the planar plate 7 so that a subsequent required mounting of the rotating coil 11 on the planar plate 7 can be eliminated. Because of that the assembly expense for the angular speed sensor can be kept particularly small so that the manufacturing costs are reduced. When the planar plate is made from silicon or glass, the acceleration sensors 1,2 can be connected by a bonding process with a planar plate 7. In one such bonding method the acceleration sensors 1,2 are simply applied to the surface of the planar plate 7 and are connected rigidly with each other by a heat treatment. Because no thick auxiliary layer, e.g. an adhesive layer such as glue, is used, in the method of the invention a particularly highly accurate adjustment of the acceleration sensors 1,2 is realized. Angular tolerances can be achieved in as little as five minutes. First signal processing circuit 29 and the light emitting diode 8 can be applied directly to the surface of the planar plate 7 by methods which are known in the prior art. In the case of silicon wafers the complete integration of the signal processing circuit 29 in the planar plate 7 is also conceivable.

Figure 5:
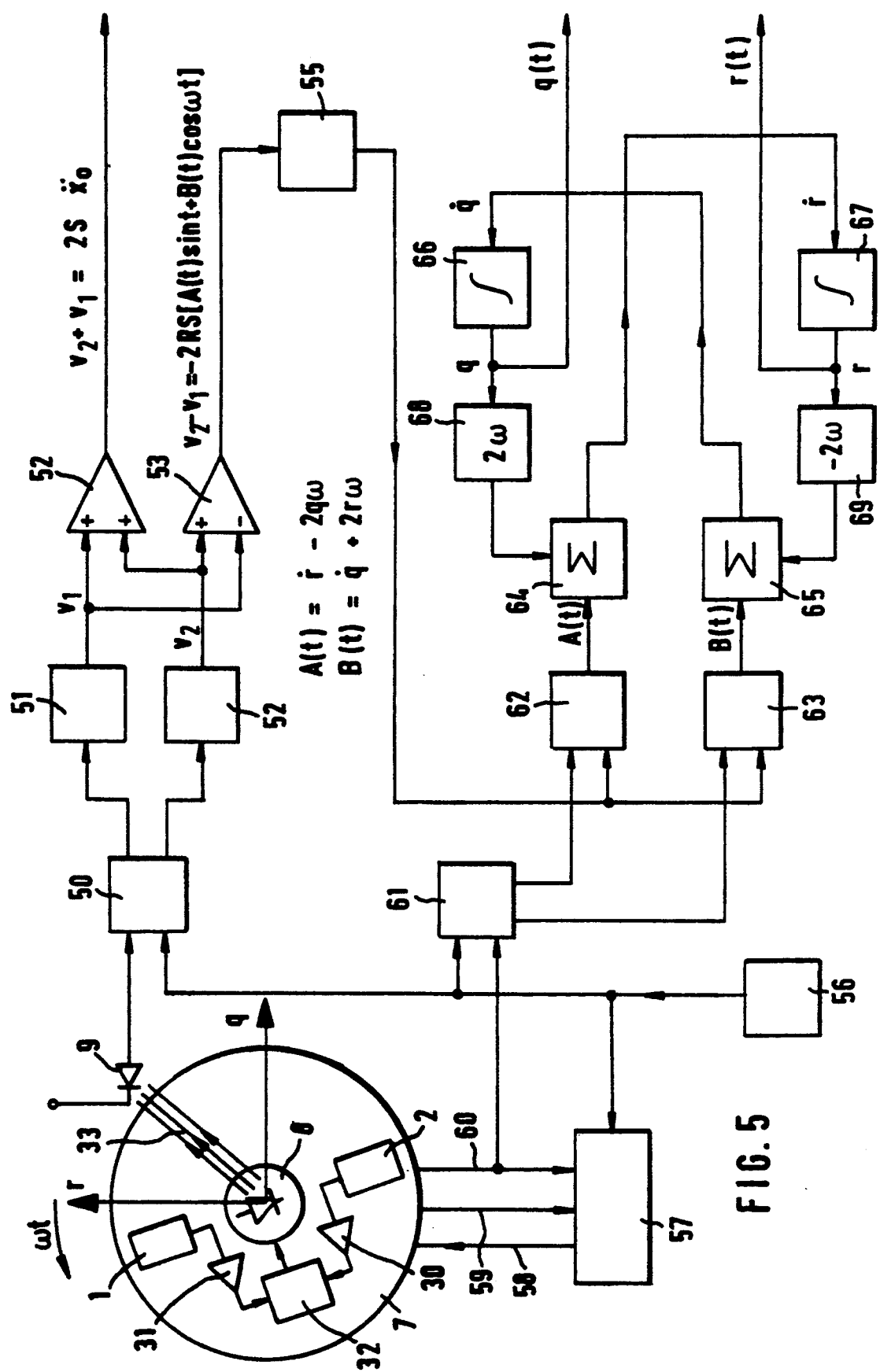
FIG. 5 is block diagram of circuit means for analysis of the electronic signal from the rotational speed sensor.

In FIG. 5 a means for analysis of the signals from the angular speed sensor is illustrated. The acceleration sensors 1,2 are connected with the input terminals of two amplifiers 30,31. The outputs of the measuring amplifiers 30,31 are connected with the inputs of a coder 32. The output of the coder 32 is directly connected to a light emitting diode 8. The encoded light from the light emitting diode 8 is received by a photodiode 9. The photodiode 9 is connected to the input of a decoder 50. The decoder 50 is connected to a pulse or frequency generator 56 to receive a signal from it. The outputs of the decoders 50 are connected with signal analyzers 51,52. An adder 52 and a difference forming element 53 are connected to receive output from the signal analyzers 51,52. The adder 52 has two positive inputs which are each connected with an output of the signal analyzer 51 and an output of the signal analyzer 52 respectively. The positive input of the difference forming element 53 is connected with the signal analyzer 52 and the negative input of the difference forming element is connected with the signal analyzer 51. The output difference forming element 53 is connected with the input of an additional signal processing means 55. The output of the additional signal processing member 55 is connected with the inputs of two synchronous modulators 62,63. Modulator controller 61 is connected to additional inputs for both synchronous modulators 62,63. The output of the pulse generator 56 is connected with the motor controller 57 and the modulator controller 61 for the synchronous modulators 62,63. The output of synchronous modulator 62 is connected with an input of the adder 64. The output of the synchronous modulator 63 is connected with an input of the adder 65. The output of the adder 64 is connected with the input of an integrator 67. The output of the adder 65 is connected with the input of another integrator 66. A resulting signal of the analysis is delivered at the output of integrator 67 but that resulting signal is also fed to a multiplying member 69. Another resulting signal of the analysis is delivered at the output of integrator 66 and also fed to the multiplying member 68. The output of the multiplying member 69 is connected to an input of the adder 65. The output of the multiplying member 68 is connected with an input of the adder 64. Further the conductor 60 is connected with an input of the modulator controller 61.

The acceleration sensors 1,2, a light emitting diode 8 and a first means 30 to 32 for processing the signals from the acceleration sensors are arranged on the planar plate 7. A measuring amplifier 30,31 is provided for each of the acceleration sensors for processing the signals from the acceleration sensors. The capacitance changes of the acceleration sensors are converted into suitable signals by the measuring amplifiers 30,31, which are delivered to the coder 32. The coder 32 converts the signals of the acceleration sensors 1,2 into control signals for the light emitting diode 8, which as indicated by the arrows 33, are transferred to a receiver element, e.g. photodiode 9. The measured signal amplifier 30,31 produces a voltage, which is proportional to capacitance of the acceleration sensors 1,2. This voltage is converted then into a frequency by coder 32, which controls the light emission from the light emitting diode as a frequency modulated signal. Particularly this signal transmission method allows the signal to be transmitted without disturbing interfering signals being picked up. The transmission from the light emitting diode to the photodiode 9 cannot be influenced by electromagnetic noise or interfering fields, which for example can occur in the motor vehicle.

The signals of the acceleration sensors 1,2 are coded by the coder 32 in such a way that they can be broken down by the decoder 50 again into both individual signals from the acceleration sensors 1,2. This occurs for example because a suitable carrier frequency is provided for the frequency modulated signals of both sensors so that by suitable filtering in the decoder 50 the signal of both acceleration sensors 1,2 can again be separated. Voltages can again be produced from the sensor signals by a frequency-voltage converter. These coded signals can be transmitted for example by a frequency modulated light emitting diode. These signals of both acceleration sensors can be recovered again from the signals from the photodiode by the decoder 50. These signals are then transmitted to the signal processing members 51,52, in which an eventual amplification and filtering occurs, by which interference or noise is suppressed. The decoder receives a timing signal from the pulse generator 56, with which the processing events in the entire circuit are synchronized. Downstream of the signal processing members 51,52 the signals of both sensors are delivered once to an adder 52 and once to a difference forming member 53. Both signals of the acceleration sensors 1,2 are added in the adder 52. The adder 52 thus produces a signal which is proportional to the acceleration in the x-direction. This signal is a quasi-by-product of the angular speed measuring device. The signal produced by the difference forming member 53 is the difference of the signals of both acceleration sensors 1,2 so that this signal is independent of the acceleration in the x-direction. This signal can be either filtered or amplified by an additional signal processing means 55 and is then fed to the synchronous demodulators 62,63. In the synchronous demodulators 62,63 controllable filter means is provided which are controlled so as to obtain the A coefficient modulated with the sine term and the B coefficient modulated with the cosine term from the difference signal of both acceleration sensors. The control signals for the synchronous demodulators 62,63 are provided by the modulator controller 61. This modulator controller 61 receives the signal of the pulse generator 56 and an angle signal, which is transmitted to the motor controller 57 by a conductor 60 from the motor which drives the planar plate 7. The motor controller itself receives the timing signal from the pulse generator 56 and is synchronized with the remainder of the analysis system. Further the motor controller 57 delivers a signal via the conductor 58 to the motor, and receives the data regarding the speed of the motor over the conductor 59. The motor is not shown here in detail so that the illustration is simplified. The control signals for the synchronous modulators 62,63 are formed from the angle signal and the timing signal so that the synchronous modulator 62 then always is controlled, when the cosine portion of the difference of both signals is zero. The synchronous modulator 63 is in contrast always controlled when the sine portion of the difference of both sensor signals is 0. The A coefficient thus appears at the output of the synchronous demodulator 62 and the B coefficient appears at the output of the synchronous demodulator.

From both these coefficients, A and B, the projections of the angular speed r and q and their derivative are determined by the computer components 64 to 69. In the adder 64 the value $2 \omega q$ is added to the A signal portion. The derivative of r thus appears at the output of the adder 64. This derivative of r is integrated in the integrator 67 and the desired signal r is thus produced, which is a projection of the rotation speed on the z-axis. In the adder 65 the term $-2 \omega r$ is added to the signal portion B, so that the derivative of q appears at the output of the adder 65. By integration via integrator 66 the projections of the angular speed on the y-axis are formed. The terms, which are added to the signal components A,B in the adders 64,65, are formed by a closed processing loop or circuit, in which the output signals r,q of the integrators 66,67 are multiplied by the multiplier 68,69 with a term $2\omega$. The closed processing loop formed by components 64 to 69 supplies a stable result for the computed values of r and q after a short rise time after being switched on.

Figure 6:
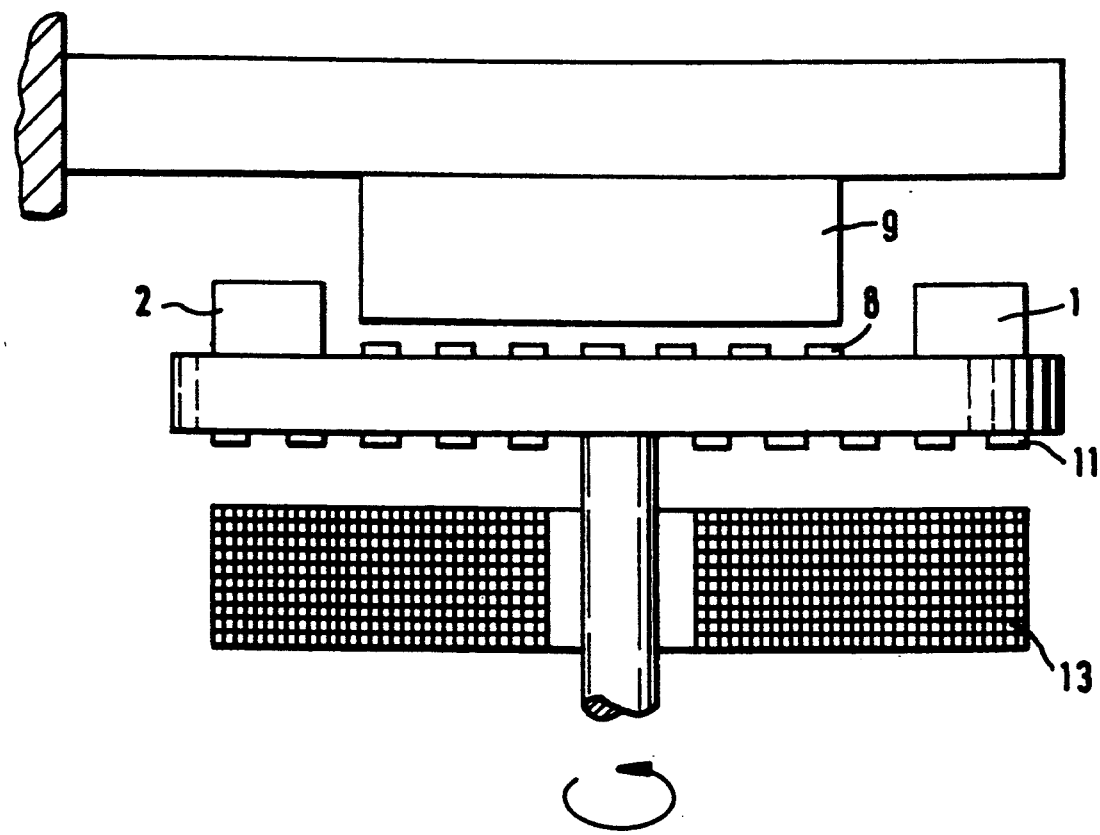
FIG. 6 is a side view of an additional embodiment of an angular speed sensor according to the invention.

An additional means for transmitting the signals of the acceleration sensors 1,2 from the planar plate 7 is shown in FIG. 6. The transmitting means 8 and the receiving means 9 are both coils, which are arranged so close to each other that the signals are transferred by induction. The transmitting means 8 is formed as a thick- or thin film coil, since it can be easily made. A plurality of embodiments for such a coil are known to one skilled in the art. The current supply of the rotating planar plate 7 occurs again by a rotating transformer, which is formed by coils 11 and 13.

While the invention has been illustrated and described as embodied in an angular speed measuring device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

What is claimed is:

1. Angular speed measuring device comprising
   a rigid planar plate rotatable about a first rotation axis;
   at least one acceleration sensor mounted on said rigid planar plate so as to be movable on a circular path about said first rotation axis by rotation of said planar plate, said at least one acceleration sensor being at least partially made of silicon and including means for generating a signal depending on a Coriolis force experienced by said at least one acceleration sensor is sensor when said at least one acceleration sensor is rotated about two other rotation axes, said two other rotation axes and said first rotation axis being orthogonal to each other;
   transmitting means for transmitting said signal off of said planar plate in a contactless manner, said transmitting means being mounted on said planar plate and connected to said at least one acceleration sensor for contactless transmission of said signal generated in said at least one acceleration sensor from said planar plate;
   receiver means for receiving said signal transmitted from said transmitting means, said receiver means being located off said planar plate; and
   means for processing said signal received by said receiver means to obtain said angular speed, said means for processing said signal received by said receiver means being connected to said receiver means and being located off said planar plate.

2. Angular speed measuring device as defined in claim 1, further comprising initial signal processing means for initial processing of said signal generated by said at least one acceleration sensor, said initial signal processing means being fixed on said planar plate and connected to said at least one acceleration sensor to receive said signal from said at least one acceleration sensor and connected to said transmitting means to transmit said signal to said receiver means.

3. Angular speed measuring device as defined in claim 1, wherein said planar plate is made of a member selected from the group consisting of glass, silicon and ceramic materials.

4. Angular speed measuring device as defined in claim 1, wherein said transmitting means comprises a light emitting diode and said receiver means comprises a photodiode.

5. Angular speed measuring device as defined in claim 1, wherein said transmitting means and said receiver means are coils.

6. Angular speed measuring device as defined in claim 2, further comprising means for supplying power to said initial signal processing means including a rotating transformer.

7. Angular speed measuring device as defined in claim 6, wherein said rotating transformer includes a rotating coil formed as one of a thickfilm coil and a thinfilm coil on an underside of the planar plate.

8. Angular speed measuring device comprising:
   a rigid planar plate rotatable about a first rotation axis;

means for rotating said planar plate in at least one rotation direction at constant rotation speed about said first rotation axis connected to said planar plate;

two acceleration sensors fixed on said planar plate and located 180° degrees from each other on said planar plate so as to be movable on a circular path about said first rotation axis by rotation of said planar plate, each of said acceleration sensors being at least partially made of silicon and including means for generating a signal from each of said acceleration sensors depending on a Coriolis force experienced by said acceleration sensors when said acceleration sensors are rotated about two other rotation axes, said two other rotation axes and said first rotation axis being in an orthogonal relationship to each other;

transmitting means for transmitting said signal of both of said acceleration sensors off said planar plate, said transmitting means being mounted on said planar plate and connected to both of said acceleration sensors for contactless transmission of said signal generated in said acceleration sensors off said planar plate;

receiver means for receiving said signal transmitted from said transmitting means, said receiver means being located off said planar plate; and means for processing said signal received by said receiver means to obtain said angular speed, said means for processing said signal received by said receiver means being connected to said receiver means and being located off said planar plate.

9. Angular speed measuring device as defined in claim 8, wherein said means for processing said signal received by said receiver means to obtain said angular speed includes a difference forming means for forming a signal difference by subtraction of said signal produced by one of said acceleration sensors from said signal produced by another of said acceleration sensors.

10. Angular speed measuring device as defined in claim 9, wherein said means for processing said signal received by said receiver means to obtain said angular speed includes phase dependent filter means for separating two signal components dependent on said angular speed from said signal difference, said phase dependent filter means being connected to said difference forming means to receive said signal difference and including synchronous modulation means for producing said two signal components.

11. Angular speed measuring device as defined in claim 10, wherein said means for processing said signal received by said receiver means includes computer means for determining said angular speed from said two signal components, said computer means being connected to said synchronous modulation means to receive said two signal components from said synchronous modulation means and to determine a projection of said angular speed on respective ones of said other two rotation axes from said two signal components.

12. Angular speed measuring device as defined in claim 11, wherein said transmitting means comprises a light emitting diode and said receiving means comprises a photodiode.

13. Angular speed measuring device as defined in claim 11, wherein said transmitting means and said receiving means are coils.

* * * * *